United States Patent
Tajima

(10) Patent No.: US 12,226,271 B2
(45) Date of Patent: Feb. 18, 2025

(54) COLORING SOLUTION FOR ZIRCONIA

(71) Applicant: KURARAY NORITAKE DENTAL INC., Kurashiki (JP)

(72) Inventor: Yuta Tajima, Aichi (JP)

(73) Assignee: KURARAY NORITAKE DENTAL INC., Kurashiki (JP)

( * ) Notice: Subject to any disclaimer, the term of this patent is extended or adjusted under 35 U.S.C. 154(b) by 330 days.

(21) Appl. No.: 17/418,407

(22) PCT Filed: Dec. 25, 2019

(86) PCT No.: PCT/JP2019/050814
§ 371 (c)(1),
(2) Date: Jun. 25, 2021

(87) PCT Pub. No.: WO2020/138163
PCT Pub. Date: Jul. 2, 2020

(65) Prior Publication Data
US 2022/0061967 A1    Mar. 3, 2022

(30) Foreign Application Priority Data
Dec. 26, 2018 (JP) .................. 2018-243476

(51) Int. Cl.
| | |
|---|---|
| A61C 13/08 | (2006.01) |
| A61C 7/14 | (2006.01) |
| A61C 8/00 | (2006.01) |
| A61C 13/00 | (2006.01) |
| A61C 13/083 | (2006.01) |
| C04B 41/00 | (2006.01) |
| C04B 41/45 | (2006.01) |
| C04B 41/82 | (2006.01) |

(52) U.S. Cl.
CPC .......... *A61C 13/082* (2013.01); *A61C 13/083* (2013.01); *C04B 41/009* (2013.01); *C04B 41/4535* (2013.01); *C04B 41/4578* (2013.01); *C04B 41/82* (2013.01); *A61C 7/14* (2013.01); *A61C 8/0012* (2013.01); *A61C 13/0006* (2013.01); *A61C 13/0022* (2013.01); *C04B 2235/3244* (2013.01); *C04B 2235/9661* (2013.01)

(58) Field of Classification Search
CPC . A61C 13/082; A61C 13/0022; A61C 13/083; A61C 13/0006; A61C 7/14; A61C 7/12; A61C 8/0012; C04B 41/0009; C04B 41/4535; C04B 41/4578; C04B 41/81; C04B 2235/9661
See application file for complete search history.

(56) References Cited

U.S. PATENT DOCUMENTS

| | | |
|---|---|---|
| 6,709,694 B1 | 3/2004 | Suttor et al. |
| 2010/0221683 A1 | 9/2010 | Franke et al. |
| 2015/0223917 A1* | 8/2015 | Herrmann ............. C04B 41/009 428/210 |
| 2018/0002235 A1 | 1/2018 | Ito et al. |
| 2018/0265420 A1* | 9/2018 | Kim ........................ C04B 41/52 |

FOREIGN PATENT DOCUMENTS

| | | |
|---|---|---|
| EP | 2 500 009 A1 | 9/2012 |
| JP | 2002-536280 A | 10/2002 |
| JP | 2010-534245 A | 11/2010 |
| JP | 2015-532629 A | 11/2015 |
| JP | 2015-536904 A | 12/2015 |
| JP | 2017-193492 * | 10/2017 |
| JP | 2017-193492 A | 10/2017 |
| KR | 10-2017-0101920 A | 9/2017 |
| WO | WO 2009/014903 A2 | 1/2009 |
| WO | WO 2013/022612 A1 | 2/2013 |
| WO | WO 2014/021940 * | 2/2014 |
| WO | WO 2014/021940 A1 | 2/2014 |
| WO | WO 2014/046949 A1 | 3/2014 |
| WO | WO 2017/185477 A1 | 11/2017 |
| WO | WO 2018/155459 A1 | 8/2018 |

OTHER PUBLICATIONS

Extended European Search Report issued Aug. 29, 2022 in European Patent Application No. 19905799.3, 9 pages.
International Search Report issued Mar. 17, 2020 in PCT/JP2019/050814 filed Dec. 25, 2019, 2 pages.

* cited by examiner

*Primary Examiner* — C Melissa Koslow
(74) *Attorney, Agent, or Firm* — Oblon, McClelland, Maier & Neustadt, L.L.P.

(57) ABSTRACT

The present invention provides a coloring solution for zirconia, which, when used on zirconia before firing of the zirconia, causes the zirconia to exhibit only a slight color difference before and after the firing and thus enables accurate prediction of the post-firing color tone of the zirconia. The present invention relates to a coloring solution for zirconia, comprising: a coloring agent (A) that is decolorized after firing of zirconia; and a metal ion solution (B), wherein, when zirconia is colored with the coloring solution and then subjected to firing, the color difference of the zirconia before and after the firing satisfies $\Delta L^* \leq 5.8$, $\Delta a^* \leq 2.4$, and $\Delta b^* \leq 4.3$.

20 Claims, No Drawings

COLORING SOLUTION FOR ZIRCONIA

CROSS-REFERENCE TO RELATED APPLICATIONS

The present application is the national stage of international application PCT/JP2019/050814, filed on Dec. 25, 2019, and claims the benefit of the filing date of Japanese Appl. No. 2018-243476, filed on Dec. 26, 2018.

TECHNICAL FIELD

The present invention relates to a coloring solution for zirconia, used for prosthetic restoration of artificial teeth and the like and capable of allowing a dental technician who is manually coloring zirconia with the coloring solution to predict the post-firing color tone of the zirconia.

BACKGROUND ART

Conventionally, metals have been the most commonly used materials for dental products (for example, prostheses such as typical veneer crowns, dental caps, crowns, and post crowns, orthodontic products, and dental implant products). However, metals are clearly distinct from natural teeth in color, and thus are inferior in terms of aesthetics. Besides, allergic reactions may be caused by eluted metal ions. On this account, in order to solve the problems associated with the use of metals, ceramic materials such as aluminium oxide (alumina) and zirconium oxide (zirconia) are used for dental products instead of the metals. In particular, the demand for zirconia is expanding owing to its high strength and relatively high quality in terms of aesthetics and also with the aid of a recent trend toward the price reduction of zirconia.

Meanwhile, in order to further enhance oral aesthetics, a dental product needs to look similar to a natural tooth. However, it is difficult to reproduce the appearance similar to that of a natural tooth solely by zirconia (sintered body). A conventionally known technique for achieving the appearance similar to that of a natural tooth is to color a zirconia pre-sintered body with a coloring solution and then fire the zirconia pre-sintered body (for example, Patent Literature 1).

CITATION LIST

Patent Literature

Patent Literature 1: JP 2015-532629 A

SUMMARY OF INVENTION

Technical Problem

Patent Literature 1 discloses a method for enhancing the visibility of a coloring solution for zirconia by adding an organic marker substance to the coloring solution. This method, however, merely aims to enhance the visibility, and the color difference before and after firing of zirconia is not described or suggested in Patent Literature 1. The method disclosed in Patent Literature 1 has a problem in that the colored portion causes a considerable color difference before and after firing of zirconia, and this makes the post-firing color tone unpredictable.

A major problem that a dental technician encounters when coloring a zirconia pre-sintered body is that the dental technician has to adjust the color tone of the coloring solution with predicting the post-firing color tone since the color tone obtained by a coloring solution at the time of coloring the zirconia pre-sintered body (i.e., before firing) differs from that after the firing. This requires expert skills.

In light of the foregoing, an object of the present invention is to provide a coloring solution for zirconia, which, when used on zirconia before firing, allows the zirconia to exhibit only a slight color difference before and after the firing and thus enables accurate prediction of the post-firing color tone of the zirconia.

Solution to Problem

The present inventors conducted intensive studies to find a solution to the foregoing issues, and found that the problems can be solved with a coloring solution for zirconia, capable of controlling the values of $\Delta L^*$, $\Delta a^*$, and $\Delta b^*$ concerning the color difference before and after firing of zirconia colored with the coloring solution to fall within specific ranges.

Specifically, the present invention includes the following.
[1] A coloring solution for zirconia, comprising:
  a coloring agent (A) that is decolorized after firing of zirconia; and
  a metal ion solution (B),
  wherein, when zirconia is colored with the coloring solution and then subjected to firing, the color difference of the zirconia before and after the firing satisfies $\Delta L^* \leq 5.8$, $\Delta a^* \leq 2.4$, and $\Delta b^* \leq 4.3$.
[2] The coloring solution according to [1], wherein the color difference before and after the firing satisfies $\Delta E^*ab < 6.5$.
[3] The coloring solution according to [1] or [2], wherein the coloring agent (A) is an organic dye.
[4] The coloring solution according to [3], wherein the organic dye is an edible dye.
[5] The coloring solution according to [4], wherein the edible dye comprises an organic dye comprising two or more aromatic groups and also comprising a ketimide group or an azo group.
[6] The coloring solution according to any one of [1] to [5], wherein the metal ion solution (B) comprises one or more coloring cations.
[7] The coloring solution according to [6], wherein the coloring cation is an ion of at least one element selected from the group consisting of Al, K, Cr, Fe, Na, V, Ni, Mn, Co, and Er.
[8] The coloring solution according to [6] or [7], wherein the coloring cation is an ion of at least one element selected from the group consisting of Al, Mn, Co, and Er.
[9] The coloring solution according to any one of [1] to [8], wherein the metal ion solution (B) comprises an ion of at least one element selected from the group consisting of Al, Fe, and Er.
[10] A colored zirconia pre-sintered body, which is colored with the coloring solution of any one of [1] to [9].
[11] A zirconia sintered body, which is produced from the colored zirconia pre-sintered body of [10].
[12] A dental product comprising: the zirconia sintered body of [11].
[13] The dental product according to [12], which is a dental prosthesis, an orthodontic product, or a dental implant product.
[14] A method for producing a colored zirconia pre-sintered body, comprising the step of:

coloring a zirconia pre-sintered body with the coloring solution of any one of [1] to [9] after milling the zirconia pre-sintered body.

[15] A method for producing a zirconia sintered body, comprising the step of:

firing the colored zirconia pre-sintered body of [10].

Advantageous Effects of Invention

A coloring solution for zirconia of the present invention does not cause a color change resulting from residual organic substances remaining after firing. This makes the post-firing color tone predictable, thereby enabling accurate adjustment of the post-firing color tone even at the time of coloring with the coloring solution (i.e., before firing). Accordingly, the color tone of a zirconia dental product can be adjusted easily without relying on expert skills. Also, a coloring solution for zirconia of the present invention allows easy discrimination between a colored portion and an uncolored portion during coloring.

DESCRIPTION OF EMBODIMENTS

It is important that a coloring solution for zirconia of the present invention comprises a coloring agent (A) that is decolorized after firing of zirconia (also may be referred to simply as "coloring agent (A)" hereinafter); and a metal ion solution (B), and that, when zirconia is colored with the coloring solution and then subjected to firing, the color difference of the zirconia before and after the firing satisfies $\Delta L^* \leq 5.8$, $\Delta a^* \leq 2.4$, and $\Delta b^* \leq 4.3$. This is described in greater details below.

As described above, when a conventional coloring solution containing only a metal ion solution is used, metal ions develop color after firing, and accordingly when a zirconia pre-sintered body is treated (for example, coated) with the coloring solution, the user cannot visually recognize whether the zirconia pre-sintered body is colored with a color as desired or approximately as desired in terms of post-firing color tone and thus has to treat (for example, coat) the zirconia pre-sintered body while predicting the post-firing color tone based on long-standing intuition and many years of experience of the user. In contrast, a coloring solution for zirconia of the present invention, which uses a coloring agent (A) in combination with a metal ion solution (B), can strongly suppress a color change of the coloring solution to reduce the color difference before and after firing of zirconia. This enables accurate prediction of the post-firing color tone, thereby allowing easy color tone adjustment during coloring with the coloring solution. Accordingly, the coloring solution is beginner-friendly. It is important that the color difference before and after firing satisfies $\Delta L^* \leq 5.8$, $\Delta a^* \leq 2.4$, and $\Delta b^* \leq 4.3$, and preferably satisfies $\Delta L^* \leq 5.7$, $\Delta a^* < 2.0$, and $\Delta b^* \leq 3.5$. The lower limits of $\Delta L^*$, $\Delta a^*$, and $\Delta b^*$ may be 0 or more (0 may be excluded). It is preferable that the color difference also satisfy $\Delta E^*ab < 6.5$, more preferably $\Delta E^*ab < 6.0$, even more preferably $\Delta E^*ab < 5.0$, particularly preferably $\Delta E^*ab < 3.2$. The lower limit of $\Delta E^*ab$ may be 0 or more (0 may be excluded). The coloring solution for zirconia, capable of controlling the color difference before and after firing to fall within the above ranges can be obtained by adjusting the type, content, and the like of each of the coloring agent (A) and the metal ion solution (B) to be described below. Moreover, as described above, when zirconia is treated (for example, coated) with the conventional coloring solution containing only a metal ion solution, the user cannot visually recognize the color of the coloring solution. In contrast, the liquid component of a coloring solution for zirconia of the present invention develops color by dissolving a coloring agent (A) in a metal ion solution (B). Accordingly, the coloring solution for zirconia also exhibits an effect of allowing easy discrimination between a portion not colored with the coloring solution (uncolored portion) and a portion colored with the coloring solution (colored portion) before firing of zirconia. Details of the method for measuring $\Delta L^*$, $\Delta a^*$, $\Delta b^*$, and $\Delta E^*ab$ concerning the color difference before and after firing are described in the EXAMPLES section below.

A coloring solution for zirconia of the present invention provides favorable aesthetics after firing, and it becomes burned out when subjected to firing. More specifically the coloring solution is brought into a state where, for example: (1) the post-firing color tone is not darkened by residual carbon; and (2) zirconia after subjected to firing does not contain large air bubbles.

Coloring Agent (A) Decolorized after Firing of Zirconia

A coloring agent (A) used in the present invention is described below. It is important that the coloring agent (A) is one that is decolorized after firing of zirconia. This can cause color development of the liquid component before firing of zirconia without affecting the color of a zirconia pre-sintered body or zirconia sintered body to be obtained after firing of the zirconia. "Decolorized after firing" means as follows. The same white zirconia pre-sintered bodies are colored with a coloring solution (I) containing only a metal ion solution (B) and a coloring solution (II) containing a coloring agent (A) and a metal ion solution (B), respectively, and then fired at 1,350° C. or higher to prepare samples of zirconia sintered bodies. The color difference $\Delta E^*ab$ (I) resulting from the color development when the coloring solution (I) is used and the color difference $\Delta E^*ab$ (II) resulting from the color development when the coloring solution (II) is used are measured. The state of being "decolorized after firing" refers to the state where the absolute value of a value given by $\Delta E^*ab$ (I)$-\Delta E^*ab$ (II) is less than 0.20, and preferably is 0.

The coloring agent (A) used in the present invention is not limited as long as it is decolorized after firing of zirconia and the above-described conditions concerning the color difference before and after firing are satisfied. Preferably, the coloring agent (A) contains an organic dye in view of the facts that the organic dye dissolves in the metal ion solution (B) and that the organic dye is burned out after firing of zirconia and thus is not incorporated into the crystal structure of zirconia. In view of the handling properties at the time of coloring a zirconia pre-sintered body the coloring agent (A) used in the present invention is preferably one that dissolves in the metal ion solution (B), i.e., one that does not remain undissolved in the metal ion solution (B) when the coloring agent (A) in an amount required for causing color development of the liquid component is added to the metal ion solution (B).

The organic dye is not limited to any particular one as long as it has a chromophore and dissolves in the metal ion solution (B). The organic dye is preferably an aromatic organic dye, i.e., an organic dye containing one or more aromatic groups that may be substituted, more preferably an aromatic organic dye having an auxochrome in addition to a chromophore. The chromophore is not limited to any particular one as long as it is an atomic group that causes color development upon binding to an aromatic ring, and examples thereof include a nitro group, an azo group, a ketimide group (>C=N—), a carbonyl group, a carbon-carbon double bond, a carbon-carbon triple bond, a carbon-nitrogen multiple bond, a thiocarbonyl group, a nitroso group, and an azoxy group. The organic dye may contain any one of such atomic groups alone, or two or more of them in any suitable combination. Examples of the auxochrome include hydroxy groups, amino groups, carboxyl groups, sulfone groups, and halogen atoms. The organic dye may contain any one of such auxochromes alone, or two or more of them in any suitable combination.

Further, since the coloring agent (A) cannot be harmful or toxic to the human body, the organic dye is preferably an edible dye, more preferably an edible dye that dissolves in the metal ion solution (B). Specific examples of such an edible dye include: organic dyes containing two or more aromatic groups, such as Yellow No. 4 (Tartrazine), Yellow No. 5 (Sunset Yellow FCF), Red No. 2 (Amaranth), Red No. 102 (New Coccine), Blue No. 1 (Brilliant Blue FCF), Blue No. 2 (Indigo Carmine), Green No. 3 (Fast Green FCF), and Red No. 102 (New Coccine); organic dyes containing a condensed aromatic group(s) with xanthene as a nucleus (xanthene dyes), such as Acid Red 289, Bromopyrrogalol Red, Rhodamine B, Rhodamine 6G, Rhodamine 6GP, Rhodamine 3GO, Rhodamine 123, Eosin (Eosin B, Eosin Y), fluorescein, and fluorescein isothiocyanate; cochineal dyes (carminic acid dyes); and betalain dyes such as Beet Red (main components: isobetanin and betanin), betanin, isobetanin, probetanin, and neobetanin. Of these, organic dyes containing two or more aromatic groups and having, as a chromophore, a ketimide group or an azo group are preferable, such as Yellow No. 4 (Tartrazine), Yellow No. 5 (Sunset Yellow FCF), Red 25 No. 2 (Amaranth), Red No. 102 (New Coccine), Blue No. 1 (Brilliant Blue FCF), Green No. 3 (Fast Green FCF), and isobetanin. The coloring agent (A) may be changed according to the content of a stabilizer(s) in a zirconia pre-sintered body for which a coloring solution for zirconia of the present invention is used. In certain preferred embodiments, the coloring solution for zirconia may be one in which the coloring agent (A) is an organic dye that contains: two or more aromatic groups; a ketimide group or an azo group as a chromophore; and a sulfone group as an auxochrome. The "aromatic group" as used herein encompasses an aromatic group whose ring structure is composed of only carbon atoms and a heteroaromatic group whose ring structure contains an element(s) other than carbon (oxygen, nitrogen, etc.). One of such coloring agents (A) may be used alone, or two or more of them may be used in any suitable combination. Such coloring agents (A) exhibit different color intensities depending on the pH of the coloring solution for zirconia, and even the structures of the compounds may vary at some pH values. However, the pH of the zirconia coloring solution is not limited to any particular value as long as the present invention can exhibit its effects, and can be set to a value at which a coloring agent (A) to be used exhibits a suitable color intensity according to the type of the coloring agent (A).

The content of the coloring agent (A) used in the present invention is not limited to any particular value as long as the coloring agent (A) can be dissolved in the metal ion solution (B) to cause the liquid component to develop color, and the mass ratio (B):(A) between the metal ion solution (B) and the coloring agent (A) is preferably about 100:0.01 to 100:3.0, more preferably about 100:0.1 to 100:1.7, even more preferably about 100:0.2 to 100:1.4, particularly preferably about 100:0.25 to 100:1.2. The content of the coloring agent (A) in a coloring solution for zirconia of the present invention is not limited to any value as long as the liquid component can develop color. The content of the coloring agent (A) is preferably 0.009 to 3.0 mass %, more preferably 0.09 to 1.6 mass %, even more preferably 0.2 to 1.4 mass %, particularly preferably 0.25 to 1.2%, relative to the total mass of the coloring solution for zirconia.

Metal Ion Solution (B)

A metal ion solution (B) used in the present invention is described below. The metal ion solution (B) contains one or more coloring cations. The "coloring" cations mean cations having significant absorption in the spectrum visible to the human eye (for example, in the wavelength range of 380 to 790 nm). The coloring cations in the present invention develop color after firing. The metal ion solution (B) is one in which the coloring agent (A) can dissolve in order to allow the coloring solution for zirconia to be applied onto a zirconia pre-sintered body and that can color the zirconia pre-sintered body after firing.

The coloring cations are preferably ions of at least one element selected from the group consisting of Al, K, Cr, Fe, Na, V, Ni, Mn, Co, and Er, even more preferably ions of at least three elements selected from the group consisting of Al, K, Cr, Fe, Na, V, Ni, Mn, Co, and Er. In certain preferred embodiments, the metal ion solution (B) preferably contains ions of at least one element selected from the group consisting of Al, Fe, and Er. The metal ion solution (B) may contain only one type of such cations, or two or more types of them in combination.

The coloring cations may be added to a solvent to be described below in the form of a salt that contains anions and the above-described cations. The anions may be selected from, for example, the group consisting of $NO_3^-$, $NO_2^-$, $CO_3^{2-}$, $HCO_3^-$, $ONC^-$, halogen anions (fluorides, chlorides, bromides), acetates, and mixtures thereof.

The metal ion solution (B) further contains a solvent. The solvent may be any solvent in which the coloring cations can dissolve, and examples thereof include water, alcohols, and ketones. More specifically, the solvent may be water, methanol, ethanol, isopropanol, n-propanol, butanol, or acetone. One of such solvents may be used alone, or a mixture of two or more of them may be used.

The content of the solvent in the metal ion solution (B) is preferably 20 to 98 mass %, more preferably 30 to 90 mass %, even more preferably 35 to 85 mass %.

The metal ion solution (B) may contain a complexing agent. The complexing agent can accelerate the dissolution process of various salts, which are added to the solvent to allow the solvent to contain the coloring cations.

Examples of the complexing agent include acetylacetonato, crown ethers, cryptands, ethylenediamine triacetate and its salts, ethylenediamine tetraacetate and its salts, nitrilotriacetate and its salts, citric acid and its salts, triethylenetetramine, porphins, polyacrylates, polyasparagate, acidic peptides, phthalocyanine, salicylate, glycinate, lactate, propylenediamine, ascorbate, oxalic acid and its salts, and mixtures thereof. One of such complexing agents may be used alone, or two or more of them may be used in combination.

The complexing agent preferably has anionic groups as complexing ligands. Complexing agents having only uncharged complexing ligands (and/or cationic ligands) like pure amines (for example, ethylen diamin at a pH value of 8 to 14) might not yield sufficiently stable solutions.

The content of the complexing agent in the metal ion solution (B) is not limited to any particular value as long as the present invention can exhibit its effects. For example, the metal ion solution (B) preferably contains the complexing agent in an amount sufficient to dissolve the coloring cations contained therein or to prevent the precipitation of these cations. Specifically the content of the complexing agent in the metal ion solution (B) is preferably 1 mass % or more, more preferably 5 mass % or more, even more preferably 10 mass % or more. The upper limit of the content is not limited to any particular value. The content of the complexing agent is preferably 50 mass % or less, 40 mass % or less, even more preferably 30 mass % or less.

The pH of the metal ion solution (B) used in the present invention is preferably 0 to 9, more preferably 1 to 7, even more preferably 2 to 6. If the pH of the metal ion solution (B) is outside the above-described ranges, the coloring cations may start to precipitate from the solution. For example, when the metal ion solution (B) is an aqueous solution, the pH thereof is preferably 0 to 9. For example, when the metal ion solution (B) does not contain an complexing agent, the pH thereof is preferably 0 to 6, and when the metal ion solution (B) contains an complexing agent, the pH thereof is preferably 3 to 9. The pH values described herein can be measured using a known measuring device. The measuring device may be, for example, "LAQUAtwin" manufactured by HORIBA, Ltd.

The content of the metal ion solution (B) in a coloring solution for zirconia of the present invention is not limited to any particular value as long as the liquid component can develop color. The content of the metal ion solution (B) is preferably 98.4 to 99.9 mass %, more preferably 98.6 to 99.8 mass %, even more preferably 98.9 to 99.8 mass %, relative to the total mass of the coloring solution.

It is preferable that a coloring solution for zirconia of the present invention have a suitable viscosity such that not only a required amount of the coloring solution can coat the surface of the zirconia but also the coloring solution can migrate into pores of a zirconia unfired body. The suitable viscosity at, for example, 25° C. is preferably 1 to 10000 mPa, more preferably 100 to 6000 mPa, even more preferably 500 to 3000 mPa. An excessively high viscosity may hinder the migration of the coloring solution into pores of a zirconia unfired body and a zirconia pre-sintered body.

A coloring solution for zirconia of the present invention may contain a thickening agent for the purpose of achieving a suitable viscosity. One type of thickening agent may be used alone, or two or more types of thickening agents may be used in combination.

Examples of the thickening agent include one or more polyols (including polyvinyl alcohol), one or more glycol ethers (for example, polyethylene glycols such as PEG 200, PEG 400, and PEG 600, diethylene glycol methyl ether, and diethylene glycol ethyl ether), one or more dialcohols and polyalcohols (including 1,2-propanediol, 1,3-propanediol, and glycerol), glycerol ethers, one or more polysaccharides (cellulose, methylcellulose, carboxymethylcellulose, carboxymethylcellulose sodium, starch, alginic acid, alginate, carrageenan, guar gum, xanthan gum, cellulose gum, hyaluronic acid, hyaluronate, pectin, pectin salts, chitin, chitosan, and the like), and mixtures thereof.

The polyethylene glycols preferably satisfy the following formula (1).

$$R^1O-(CH_2-CH_2-O)_m-R^1 \qquad (1)$$

In the formula (1), $R^1$ is a hydrogen atom, an acyl group, an alkyl group, an aryl group, an alkylaryl group, polypropyl glycol, or polytetrahydrofuran (polyTHF), and preferably is a hydrogen atom, an acetyl group, a methyl group, an ethyl group, a propyl group, a butyl group, a hexyl group, an octyl group, a nonyl group, a decyl group, a lauryl group, a tridecyl group, a myristyl group, a palmityl group, a stearyl group, an oleyl group, an allyl group, a phenyl group, a p-alkylphenyl group, polypropylene glycol, polyTHF. m is 2 to 100, preferably 2 to 20, more preferably 2 to 5. The two $R^1$s may be the same or different from each other.

The weight-average molecular weight (Mw) of the polyethylene glycol may be in the range of 100 to 5,000, preferably in the range of 100 to 1,000, more preferably in the range of 100 to 300. The Mw can be measured by gel permeation chromatography (GPC).

The content of the thickening agent in a coloring solution for zirconia of the present invention is preferably 0.01 to 10 mass %, more preferably 0.1 to 8 mass %, even more preferably 0.2 to 5 mass %.

A coloring solution for zirconia of the present invention may further contain one or more other additives, provided that the effects of the present invention are not impaired.

Examples of the additive include stabilizers (for example, methoxyphenol hydroquinone, Topanol A, and a mixture thereof), buffers (for example, acetate buffer, amino buffer, and a mixture thereof), preservatives (for example, sorbic acid, benzoic acid, and a mixture thereof), and mixtures thereof.

The content of the additive(s) in a coloring solution for zirconia of the present invention is preferably 0.01 to 10 mass %, more preferably 0.05 to 5 mass %, even more preferably 0.1 to 3 mass %.

By using a coloring solution for zirconia of the present invention, color change is suppressed to reduce the color difference before and after firing of zirconia. Zirconia to be colored with a coloring solution for zirconia of the present invention may be in the form of an unfired body or a pre-sintered body as long as it is not yet sintered. In view of penetration of the coloring solution, the zirconia is preferably a zirconia pre-sintered body.

Further, the present invention includes a colored zirconia pre-sintered body obtained by coloring a zirconia pre-sintered body with the coloring solution for zirconia, i.e., a zirconia pre-sintered body colored with the coloring solution for zirconia (referred to as "colored zirconia pre-sintered body"). The content of the coloring solution for zirconia is not limited to any particular value as long as the present invention can exhibit its effects, and can be adjusted as appropriate according to the intensity of color development desired to be achieved after sintering. In the present invention, a pre-sintered body before being colored with the coloring solution for zirconia is distinguished from the pre-sintered body after being colored with the coloring solution by referring the former simply as "zirconia pre-sintered body" and the latter as "colored zirconia pre-sintered body". A coloring solution for zirconia of the present invention also can be used for coloring a zirconia unfired body. In such a case, the zirconia unfired body is fabricated into a zirconia sintered body without being turned into a zirconia pre-sintered body as an intermediate process. In the case of fabricating such a sintered body, various conditions given in the following description concerning a zirconia pre-sintered body are also applicable as conditions for preferred embodiments of the above-described zirconia unfired body.

A zirconia pre-sintered body used in the present invention is described below. A zirconia pre-sintered body refers to a body obtained by forming a material containing zirconia ($ZrO_2$; zirconium oxide) as a main component into a desired shape according to a dental product intended to be obtained and then pre-sintering the zirconia. For example, when the dental product is a dental prostheses or a dental implant product, a disc, block, or the like obtained by press-molding a zirconia powder using a known technique can be fabricated into the zirconia pre-sintered body.

The zirconia pre-sintered body in the present invention preferably contains a stabilizer(s). For example, the stabilizer(s) are preferably added to zirconia before pre-sintering.

The stabilizer is preferably yttrium oxide ($Y_2O_3$) (hereinafter, referred to as "yttria"), for example, and is preferably at least one oxide selected from the group consisting of calcium oxide (calcia; CaO), magnesium oxide (magnesia; MgO), cerium oxide (ceria; $CeO_2$), scandium oxide ($Sc_2O_3$), niobium oxide ($Nb_2O_5$), lanthanum oxide ($La_2O_3$), erbium oxide ($Er_2O_3$), praseodymium oxide ($Pr_6O_{11}$), samarium oxide ($Sm_2O_3$), europium oxide ($Eu_2O$), and thulium oxide ($Tm_2O_3$). Yttria is particularly preferred as the stabilizer. One type of stabilizer may be used alone, or two or more types of stabilizers may be used in combination.

When the stabilizer contains yttria, the yttria content is preferably 2 to 8 mol %, more preferably 3 to 6 mol %, relative to the total mole (100%) of the zirconia and the yttria. When the yttria content is in this range, the phase transformation to monoclinic crystals can be suppressed and the transparency of the resulting zirconia sintered body can be improved.

When the zirconia contains calcium oxide, the content of the calcium oxide is preferably 15 mol % or less, more preferably 12 mol % or less, relative to the total mole (100%) of the zirconia and the stabilizer.

When the zirconia contains magnesium oxide, the content of the magnesium oxide is preferably 12 mol % or less, more preferably 10 mol % or less, relative to the total mole (100%) of the zirconia and the stabilizer.

When the zirconia contains cerium oxide, the content of the cerium oxide is preferably 18 mol % or less, more preferably 12 mol % or less, relative to the total mole (100%) of the zirconia and the stabilizer.

When the zirconia contains scandium oxide, the content of the scandium oxide is preferably 1 mol % or less, more preferably 0.3 mol % or less, relative to the total mole (100%) of the zirconia and the stabilizer.

When the zirconia contains niobium oxide, the content of the niobium oxide is preferably 10 mol % or less, more preferably 7 mol % or less, relative to the total mole (100%) of the zirconia and the stabilizer.

When the zirconia contains lanthanum oxide, the content of the lanthanum oxide is preferably 10 mol % or less, more preferably 7 mol % or less, relative to the total mole (100%) of the zirconia and the stabilizer.

When the zirconia contains erbium oxide, the content of the erbium oxide is preferably 1 mol % or less, more preferably 0.3 mol % or less, relative to the total mole (100%) of the zirconia and the stabilizer.

When the zirconia contains praseodymium oxide, the content of the praseodymium oxide is preferably 1 mol % or less, more preferably 0.3 mol % or less, relative to the total mole (100%) of the zirconia and the stabilizer.

When the zirconia contains samarium oxide, the content of the samarium oxide is preferably 1 mol % or less, more preferably 0.3 mol % or less, relative to the total mole (100%) of the zirconia and the stabilizer.

When the zirconia contains europium oxide, the content of the europium oxide is preferably 1 mol % or less, more preferably 0.3 mol % or less, relative to the total mole (100%) of the zirconia and the stabilizer.

When the zirconia contains thulium oxide, the content of the thulium oxide is preferably 1 mol % or less, more preferably 0.3 mol % or less, relative to the total mole (100%) of the zirconia and the stabilizer.

A zirconia pre-sintered body used in the present invention may contain a pigment(s) as a coloring component other than the coloring agent (A) and the metal ion solution (B). Even when the zirconia pre-sintered body contains a pigment(s), the color difference before and after firing is reduced by using a coloring solution for zirconia of the present invention, whereby accurate prediction of the post-firing color tone becomes possible. The pigment is not limited as long as the present invention can exhibit its effects, and examples thereof include chromium oxide ($Cr_2O_3$) and iron oxide ($Fe_2O_3$). Such pigments may be used in combination. A coloring solution for zirconia of a certain preferred embodiment is a coloring solution whose coloring components essentially consist of the coloring agent (A) and the metal ion solution (B), wherein, when zirconia is colored with the coloring solution and then subjected to firing, the color difference of the zirconia before and after the firing satisfies $\Delta E^*ab < 6.5$. "Coloring components essentially consist of the coloring agent (A) and the metal ion solution (B)" means that the content of a coloring component(s) other than the coloring agent (A) and the metal ion solution (B) is less than 0.001 mass %, more preferably less than 0.0001 mass %, even more preferably less than 0.00001 mass %.

The following describes a typical method for producing a zirconia pre-sintered body of the present invention.

First, raw material zirconia granules containing a stabilizer are prepared, and they are press-molded into a block shape, disc shape, or the like. Next, the resulting molded body is optionally subjected to cold isostatic pressing (CIP). The pressure applied at this time is 50 to 500 MPa, for example. Subsequently the molded body is pre-sintered. For pre-sintering, the molded body is gradually heated from room temperature to a temperature of 800° C. to 1200° C. and retained at the temperature for about 1 to 6 hours. As a result, the molded body can be fabricated into a zirconia pre-sintered body. The thus-obtained zirconia pre-sintered body is milled using a conventionally known device into a desired shape according to a dental product to be obtained finally. For example, when the dental product is a dental prosthesis, the zirconia pre-sintered body is milled into a crown shape using a CAD/CAM system or the like.

A method for producing a colored zirconia pre-sintered body of the present invention includes the step of coloring a zirconia pre-sintered body with the coloring solution for zirconia after milling the zirconia pre-sintered body. Examples of a method for coloring a zirconia pre-sintered body with the coloring solution for zirconia include various coating methods such as applying the coloring solution onto the zirconia pre-sintered body using a brush or the like, immersing the zirconia pre-sintered body in a container containing the coloring solution, and spraying the coloring solution onto the zirconia pre-sintered body using a spray or the like, and conventionally known instruments and devices can be used for coloring. The coloring solution for zirconia may penetrate into pores of a zirconia pre-sintered body, as described above. Accordingly, as a method for producing a colored zirconia pre-sintered body of the present invention, any methods that cause the coloring solution to penetrate into pores of a zirconia pre-sintered body also can be used without any particular limitation. When a zirconia unfired body is directly fabricated into a zirconia sintered body without performing a pre-sintering step, the zirconia unfired body after being milled may be colored with the coloring solution for zirconia.

The present invention further includes a zirconia sintered body produced from the colored zirconia pre-sintered body. A method for producing the zirconia sintered body includes the step of firing the colored zirconia pre-sintered body. The firing temperature (maximum firing temperature) can be adjusted as appropriate according to the type of zirconia, and is not limited to any particular value as long as the coloring agent (A) is decolorized and the metal ion solution (B) develops color. The firing temperature (maximum firing temperature) is preferably 1,350° C. or more, more preferably 1,450° C. or more, even more preferably 1,500° C. or more. The upper limit of the firing temperature is not limited to any particular value, and is preferably 1,600° C. or less, for example. A zirconia sintered body of the present invention includes not only sintered bodies produced by sintering molded zirconia particles under ordinary pressure or no applied pressure, but also sintered bodies that have been densified by a high-temperature pressure process such as hot isostatic pressing (HIP).

The content of the stabilizer in a zirconia sintered body of the present invention can be measured using a technique, for example, such as inductively coupled plasma (ICP) emission spectral analysis or X-ray fluorescence analysis.

A zirconia sintered body of the present invention preferably includes at least one of partially stabilized zirconia and fully stabilized zirconia as a matrix phase. In the zirconia sintered body, the predominant crystal phase of zirconia is at least one of a tetragonal crystal phase and a cubic crystal phase. The zirconia sintered body may contain both tetragonal crystals and cubic crystals. It is preferable that the zirconia sintered body is essentially free of monoclinic crystals. Zirconia partially stabilized by adding a stabilizer is called "partially stabilized zirconia (PSZ)", and zirconia fully stabilized by adding a stabilizer is called "fully stabilized zirconia".

The present invention includes a dental product comprising the zirconia sintered body. The dental product may be, for example, a dental prosthesis, an orthodontic product, or a dental implant product. Examples of the dental prosthesis include inlays, onlays, laminated veneers, and crowns that are made of zirconia.

In the above embodiments, the type, content, and the like of each of the components may be changed as appropriate, and various changes may be made such as adding or removing optional components. Further, in the above embodiments, the composition of the coloring solution for zirconia and the values indicating the characteristics of the coloring solution (such as the color difference before and after firing of a colored zirconia pre-sintered body) may be changed and combined as appropriate.

The present invention encompasses combinations of the foregoing features, provided that such combinations made in various forms within the technical idea of the present invention can produce the effects of the present invention.

EXAMPLES

The following describes the present invention in greater detail by way of Examples. It should be noted that the present invention is in no way limited by the following Examples, and various changes may be made by a person with ordinary skill in the art within the technical idea of the present invention.

Evaluation of Color Difference Before and After Firing of Colored Zirconia Pre-Sintered Body Zirconia pre-sintered bodies were colored with coloring solutions for zirconia of Examples and Comparative Examples, respectively. For each Example and Comparative Example, the colored zirconia pre-sintered body before firing and a zirconia sintered body obtained after the firing were used as samples. For each sample, the chromaticity (L*, a*, b*) in the CIE 1976 color space (L*a*b* color space) was measured using a dental color analysis system (Olympus Corporation, Crystaleye). Then, the color difference ΔE*ab was calculated as the difference in color tone before and after the firing as per the following equation.

$$\Delta E^{*}ab = \{(\Delta L^{*})^{2}+(\Delta a^{*})^{2}+(\Delta b^{*})^{2}\}^{1/2}$$

In the equation, ΔL* is the difference in the lightness index L* before and after the firing, Δa* is the difference in the color coordinate a* before and after the firing, and Δb* is the difference in the color coordinate b* before and after the firing. These values were determined in a manner that complies with JIS Z 8781-4: 2013.

A smaller color difference ΔE*ab is better. Concerning the color difference ΔE*ab after firing, the following examples of color tolerance are given in the Japanese Industrial Standards (JIS) and various industrial fields.

0≤ΔE*ab<0.2: The color difference falls within an error range even with a specially adjusted colorimeter, and cannot be discriminated by humans (unevaluable range).

0.2≤ΔE*ab<0.4: The color difference falls within the range of reproducibility of a well-adjusted colorimeter, and corresponds to the limit of reproducible discrimination by a trained person (discrimination threshold).

0.4≤ΔE*ab<0.8: This is the limit to set up strict standards for permissible color difference in view of reproducibility of visual inspection (Grade AAA color tolerance).

0.8≤ΔE*ab<1.6: A slight color difference is perceived when comparing adjacent colors. The color difference is within the range of permissible color difference, including instrumental differences among typical colorimeters (Grade AA color tolerance).

1.6≤ΔE*ab<3.2: The color difference is hardly perceptible in comparison of colors spaced apart from each other. The color difference at this level is generally considered as the same color (Grade A color tolerance).

3.2≤ΔE*ab<6.5: The color difference in this range can be treated as the same color at the impression level. In the paint and plastics industries, the color difference at this level may result in complaints (Grade B color tolerance).

6.5≤ΔE*ab<13.0: The color difference in this range corresponds to approximately one step on the Book of JIS Color Standards, Munsell color systems, and the like (Grade C color tolerance).

13.0≤ΔE*ab<25.0: Colors at this color difference level can be discriminated from each other by subdivided systematic color names. Exceeding this upper limit results in an impression that colors have different color names (Grade D color tolerance).

Method for Producing Zirconia Pre-Sintered Body

The following describes a method for producing a zirconia pre-sintered body colored with a coloring solution for zirconia in each of Examples and Comparative Examples to be described below.

First, a zirconia powder and yttria as a stabilizer were mixed wet in water to prepare a slurry having a specific yttria content. The thus-obtained slurry was granulated by drying, and the resulting granules are pre-sintered to prepare a primary powder. Next, the thus-obtained primary powder was press-molded to prepare a molded product as a zirconia unfired body. Thereafter, the obtained molded product was fired at 800° C. to 1200° C. to prepare a zirconia pre-sintered body. Zirconia pre-sintered bodies (Production Examples 1 to 3) obtained in the above-described manner were cut into plate-shaped pieces (length: about 20 mm, width: about 20 mm, thickness: about 1.5 mm) to adapt them to use in Examples and Comparative Examples to be described below. The yttria contents in the respective zirconia pre-sintered bodies were 6 mol % in Production Example 1, 5.5 mol % in Production Example 2, and 4 mol % in Production Example 3.

When a zirconia pre-sintered body needs to contain a pigment, the pigment may be added to the above-described primary powder. The zirconia pre-sintered body containing the pigment can be obtained by pulverizing and mixing the primary powder containing the pigment in water until zirconia has a desired particle size to form a zirconia slurry, granulating the obtained slurry by drying, pre-sintering the resulting granules to prepare a secondary power, and then using this secondary power in the above-described press-molding. When an additive such as aluminium oxide, titanium oxide, or a binder needs to be added to the zirconia pre-sintered body, it may be added during the preparation of the primary powder or the secondary powder.

In Examples and Comparative Examples to be described below, the following coloring agents (A) and metal ion solutions (B) were used.

Coloring Agent (A)
  Food Red No. 102 (KYORITSU SHOKUHIN K.K.)
  Food Blue No. 1 (KYORITSU SHOKUHIN K.K.)
  Food Yellow No. 4 (KYORITSU SHOKUHIN K.K.)
  Beet Red (Watashino-Daidokoro Inc.)
Metal Ion Solution (B)
  (B-1) CopraSupreme Color Incisal Dark (WhitePeaks Dental Solutions) (containing cations of Al, K, Co, and Er)
  (B-2) CopraSupreme Color Occlusal Pink (WhitePeaks Dental Solutions) (containing cations of Fe, Ni, and Er)
  (B-3) CopraSupreme Color Body A3 (WhitePeaks Dental Solutions) (containing cations of Al, Cr, Mn, Fe, and Er)
  (B-4) CopraSupreme Color Occlusal Yellow (WhitePeaks Dental Solutions) (containing cations of Na, Al, K, Ca, V Cr, Mn, and Fe)

Example 1

A coloring solution for zirconia of Example 1 was obtained by adding, as coloring agents (A), 0.0221 g of Food Red No. 102 and 0.0102 g of Food Blue No. 1 to 2.0 g of CopraSupreme Color Incisal Dark as a metal ion solution (B), and mixing them together. The zirconia pre-sintered body obtained in Production Example 1 was colored by applying a proper amount of the resulting coloring solution thereto. Thereafter, the colored zirconia pre-sintered body was fired into a zirconia sintered body by firing at 1,560° C. with a retention time of 30 minutes. The evaluation result concerning the color difference ΔE*ab before and after the firing is presented in Table 1.

Examples 2 to 7

Coloring solutions for zirconia of Examples 2 to 7 were obtained in the same manner as in Example 1, except that the types and the amounts of coloring agents (A) and metal ion solutions (B) used therein were set as presented in Table 1. Zirconia sintered bodies of Examples 2 to 7 were obtained in the same manner as in Example 1, except that proper amounts of the thus-obtained coloring solutions were used and that the zirconia pre-sintered bodies, the firing temperatures, and the retention times used therein were set as presented in Table 1. The evaluation results concerning the color difference ΔE*ab before and after the firing are presented in Table 1.

Comparative Example 1

CopraSupreme Color Incisal Dark, which is a metal ion solution (B), was used alone as a coloring solution for zirconia. The zirconia pre-sintered body obtained in Production Example 1 was colored by applying a proper amount of this coloring solution thereto. Thereafter, the colored zirconia pre-sintered body was fired into a zirconia sintered body by firing at 1,560° C. with a retention time of 30 minutes. The evaluation result concerning the color difference ΔE*ab before and after the firing is presented in Table 1.

Comparative Examples 2 to 12

Zirconia sintered bodies of Comparative Examples 2 to 12 were obtained in the same manner as in Comparative Example 1, except that the types of metal ion solutions used therein were set as presented in Table 1 and that the zirconia pre-sintered bodies, the firing temperatures, and the retention times used therein were set as presented in Table 1. The evaluation results concerning the color difference ΔE*ab before and after the firing are presented in Table 1.

TABLE 1

| | Coloring solution for zirconia | | | | | | Zirconia pre-sintered body | | Firing | | Evaluation result | | | |
|---|---|---|---|---|---|---|---|---|---|---|---|---|---|---|
| | Metal ion solution (B) | | Coloring agent (A) | | Amount of use[1] (g) | | | | conditions | | ΔL* | Δa* | Δb* | ΔE*ab |
| | Type | Amount of use[1] (g) | Food Red No. 102 | Food Blue No. 1 | Food Yellow No. 4 | Beet Red | Type | Amount of yttria (mol %) | Firing temperature (° C.) | Retention time (min) | before and after firing | before and after firing | before and after firing | before and after firing |
| Ex. 1 | (B-1) | 2.0 | 0.0221 | 0.0102 | — | — | Production Ex.1 | 6.0 | 1560 | 30 | 2.08 | 1.96 | 3.38 | 4.43 |
| Ex. 2 | (B-3) | 1.5 | 0.0026 | — | 0.0013 | — | Production Ex.1 | 6.0 | 1560 | 30 | 1.81 | 1.94 | 2.46 | 3.62 |
| Ex. 3 | (B-4) | 2.0 | — | — | 0.0020 | — | Production Ex.1 | 6.0 | 1560 | 30 | 3.41 | 2.40 | 4.29 | 5.98 |
| Ex. 4 | (B-2) | 2.0 | 0.0247 | — | — | 0.0032 | Production Ex.2 | 5.5 | 1560 | 30 | 0.76 | 0.03 | 2.71 | 2.81 |
| Ex. 5 | (B-3) | 1.5 | 0.0059 | — | 0.0122 | — | Production Ex.2 | 5.5 | 1560 | 30 | 5.73 | 0.19 | 1.39 | 5.90 |
| Ex. 6 | (B-4) | 2.0 | — | — | 0.0045 | — | Production Ex.2 | 5.5 | 1560 | 30 | 5.64 | 0.80 | 2.20 | 6.11 |
| Ex. 7 | (B-4) | 2.0 | — | — | 0.0080 | — | Production Ex.3 | 4.0 | 1515 | 30 | 2.18 | 0.80 | 0.78 | 2.45 |

TABLE 1-continued

| | Coloring solution for zirconia | | | | | Zirconia pre-sintered body | | Firing conditions | | Evaluation result | | | |
|---|---|---|---|---|---|---|---|---|---|---|---|---|---|
| | Metal ion solution (B) | | Coloring agent (A) | | | Amount of use¹⁾ (g) | | | | ΔL* | Δa* | Δb* | ΔE*ab |
| | Type | Amount of use¹⁾ (g) | Food Red No. 102 | Food Blue No. 1 | Food Yellow No. 4 | Beet Red | Type | Amount of yttria (mol %) | Firing temperature (°C.) | Retention time (min) | before and after firing | before and after firing | before and after firing | before and after firing |
| Com. Ex. 1 | (B-1) | | — | — | — | — | Production Ex. 1 | 6.0 | 1560 | 30 | 19.54 | 6.13 | 7.99 | 21.98 |
| Com. Ex. 2 | (B-2) | | — | — | — | — | Production Ex.1 | 6.0 | 1560 | 30 | 8.08 | 10.03 | 4.61 | 13.67 |
| Com. Ex. 3 | (B-3) | | — | — | — | — | Production Ex.1 | 6.0 | 1560 | 30 | 11.98 | 6.12 | 6.39 | 14.89 |
| Com. Ex. 4 | (B-4) | | — | — | — | — | Production Ex.1 | 6.0 | 1560 | 30 | 3.67 | 3.21 | 6.99 | 8.52 |
| Com. Ex. 5 | (B-1) | | — | — | — | — | Production Ex.2 | 5.5 | 1560 | 30 | 29.78 | 7.93 | 12.39 | 33.22 |
| Com. Ex. 6 | (B-2) | | — | — | — | — | Production Ex.2 | 5.5 | 1560 | 30 | 10.77 | 13.81 | 4.52 | 18.09 |
| Com. Ex. 7 | (B-3) | | — | — | — | — | Production Ex.2 | 5.5 | 1560 | 30 | 20.29 | 8.65 | 10.86 | 24.59 |
| Com. Ex. 8 | (B-4) | | — | — | — | — | Production Ex.2 | 5.5 | 1560 | 30 | 9.15 | 3.35 | 14.63 | 17.58 |
| Com. Ex. 9 | (B-1) | | — | — | — | — | Production Ex.3 | 4.0 | 1515 | 30 | 27.99 | 6.41 | 5.94 | 29.32 |
| Com. Ex. 10 | B-2) | | — | — | — | — | Production Ex.3 | 4.0 | 1515 | 30 | 13.35 | 12.79 | 2.99 | 18.73 |
| Com. Ex. 11 | (B-3) | | — | — | — | — | Production Ex.3 | 4.0 | 1515 | 30 | 24.78 | 9.31 | 8.92 | 27.93 |
| Com. Ex. 12 | (B-4) | | — | — | — | — | Production Ex.3 | 4.0 | 1515 | 30 | 11.36 | 1.95 | 11.75 | 16.46 |

¹⁾"Amount of use" refers to an amount of each of a metal ion solution (B) and a coloring agent(s) (A) used for preparing a coloring solution for zirconia by mixing them together.

As can be seen in Table 1, the values of ΔE*ab in Examples 1 to 7 were all smaller than 6.5, and the color differences before and after the firing all correspond to a color tolerance at or higher than Grade B. In contrast, the values of ΔE*ab obtained in Comparative Examples 1 to 12 in which the coloring agent (A) was not used were all much greater than 6.5. These results confirm that a coloring solution for zirconia of the present invention can drastically reduce the color difference before and after firing of a zirconia pre-sintered body.

INDUSTRIAL APPLICABILITY

In a coloring solution for zirconia of the present invention, a coloring agent added to a liquid component dissolves in a metal ion solution at room temperature (1C to 30° C.), thereby causing the liquid component to develop color. Accordingly when zirconia before subjected to firing is colored with the coloring solution, the zirconia exhibits only a slight color difference before and after the firing, whereby the post-firing color tone of the zirconia can be predicted accurately. It is expected that the demand for all-ceramic dental crowns expands more and more in the future, resulting in increasing opportunities to use coloring solutions. A coloring solution for zirconia of the present invention is particularly useful in production of all-ceramic dental crowns as dental products.

The invention claimed is:
1. A coloring solution, comprising:
(A) a coloring agent that is decolorized after firing of zirconia; and
(B) a metal ion solution comprises a coloring cation,
wherein the coloring cation comprises Al, K, Na, and/or Ni, in ionic form, and
wherein, when zirconia is colored with the coloring solution and then subjected to firing, the color difference of the zirconia before and after the firing satisfies ΔL*≤5.8, Δa*≤2.4, and Δb*≤4.3.
2. The coloring solution of claim 1, wherein the color difference before and after the firing satisfies ΔE*ab<6.5.
3. The coloring solution of claim 1, wherein the coloring agent (A) is an organic dye.
4. The coloring solution of claim 3, wherein the organic dye is an edible dye.
5. The coloring solution of claim 4, wherein the edible dye comprises an organic dye comprising two or more aromatic groups and also comprising a ketimide group or an azo group.
6. The coloring solution of claim 1, wherein the coloring cation comprises the Al, and further comprises Fe and/or Er in ionic form.
7. The coloring solution of claim 1, wherein the coloring cation further comprises Er in ionic form.
8. The coloring solution of claim 1, wherein the metal ion solution (B) comprises the Al in ionic form.
9. The coloring solution of claim 1, wherein the metal ion solution (B) further comprises Fe in ionic form.
10. The coloring solution of claim 1, wherein the metal ion solution (B) comprises the Al and further comprises Er in ionic form.
11. The coloring solution of claim 1, wherein the metal ion solution (B) further comprises Fe and Er in ionic form.
12. The coloring solution of claim 1, wherein the metal ion solution (B) further comprises the Ni in ionic form.

13. A colored zirconia pre-sintered body, which is colored with the coloring solution of claim 1.

14. A zirconia sintered body, produced from the colored zirconia pre-sintered body of claim 13.

15. A dental product, comprising:
the zirconia sintered body of claim 14.

16. The dental product of claim 15, which is a dental prosthesis, an orthodontic product, or a dental implant product.

17. A method for producing a colored zirconia pre-sintered body, the method comprising:
coloring a zirconia pre-sintered body with the coloring solution of claim 1 after milling the zirconia pre-sintered body.

18. A method for producing a zirconia sintered body, the method comprising:
firing the colored zirconia pre-sintered body of claim 13.

19. A coloring solution, comprising:
(A) a coloring agent that is decolorized after firing of zirconia; and
(B) a metal ion solution comprises a coloring cation,
wherein the metal ion solution (B) comprises Al and Fe in ionic form, and
wherein, when zirconia is colored with the coloring solution and then subjected to firing, the color difference of the zirconia before and after the firing satisfies $\Delta L^* \leq 5.8$, $\Delta a^* \leq 2.4$, and $\Delta b^* \leq 4.3$.

20. A coloring solution, comprising:
(A) a coloring agent that is decolorized after firing of zirconia; and
(B) a metal ion solution comprises a coloring cation,
wherein the metal ion solution (B) comprises Al, Fe, and Er in ionic form, and
wherein, when zirconia is colored with the coloring solution and then subjected to firing, the color difference of the zirconia before and after the firing satisfies $\Delta L^* \leq 5.8$, $\Delta a^* \leq 2.4$, and $\Delta b^* \leq 4.3$.

* * * * *